(12) United States Patent
Kim et al.

(10) Patent No.: US 11,461,653 B2
(45) Date of Patent: Oct. 4, 2022

(54) LEARNING METHOD AND LEARNING DEVICE FOR CNN USING 1XK OR KX1 CONVOLUTION TO BE USED FOR HARDWARE OPTIMIZATION, AND TESTING METHOD AND TESTING DEVICE USING THE SAME

(71) Applicant: Stradvision, Inc., Gyeongbuk (KR)

(72) Inventors: Kye-Hyeon Kim, Seoul (KR);
Yongjoong Kim, Gyeongsangbuk-do (KR); Insu Kim, Gyeongsangbuk-do (KR); Hak-Kyoung Kim, Gyeongsangbuk-do (KR); Woonhyun Nam, Gyeongsangbuk-do (KR); SukHoon Boo, Gyeonggi-do (KR); Myungchul Sung, Gyeongsangbuk-do (KR); Donghun Yeo, Gyeongsangbuk-do (KR); Wooju Ryu, Gyeongsangbuk-do (KR); Taewoong Jang, Seoul (KR); Kyungjoong Jeong, Gyeongsangbuk-do (KR); Hongmo Je, Gyeongsangbuk-do (KR); Hojin Cho, Gyeongsangbuk-do (KR)

(73) Assignee: STRADVISION, INC., Gyeongbuk (KR)

( * ) Notice: Subject to any disclaimer, the term of this patent is extended or adjusted under 35 U.S.C. 154(b) by 125 days.

(21) Appl. No.: 16/255,109

(22) Filed: Jan. 23, 2019

(65) Prior Publication Data

US 2020/0234135 A1 Jul. 23, 2020

(51) Int. Cl.
*G06N 3/04* (2006.01)
*G06N 3/08* (2006.01)
(Continued)

(52) U.S. Cl.
CPC .......... *G06N 3/084* (2013.01); *G06F 11/3466* (2013.01); *G06F 13/378* (2013.01); *G06F 17/15* (2013.01); *G06N 3/04* (2013.01); *G06N 3/0472* (2013.01)

(58) Field of Classification Search
CPC .......... G06N 3/084; G06N 5/046; G06N 3/04; G06V 10/40
See application file for complete search history.

(56) References Cited

U.S. PATENT DOCUMENTS 10,474,993 B2 * 11/2019 Fisher .................... G06V 40/20
2016/0342890 A1 * 11/2016 Young ..................... G06N 5/04
(Continued)

FOREIGN PATENT DOCUMENTS

CN 110800062 A 2/2020
CN 110870020 A 3/2020

OTHER PUBLICATIONS

Zheng, Y., Liu, Q., Chen, E., Ge, Y., & Zhao, J. L. (Jun. 2014). Time series classification using multi-channels deep convolutional neural networks. In International Conference on Web-Age Information Management (pp. 298-310). Springer, Cham. (Year: 2014).*
(Continued)

*Primary Examiner* — Michael J Huntley
*Assistant Examiner* — Oluwatosin O Alabi
(74) *Attorney, Agent, or Firm* — Xsensus LLP

(57) ABSTRACT

A method for learning parameters of a CNN using a 1×K convolution operation or a K×1 convolution operation is provided to be used for hardware optimization which satisfies KPI. The method includes steps of: a learning device (a) instructing a reshaping layer to two-dimensionally concatenate features in each group comprised of corresponding K channels of a training image or its processed feature map, to thereby generate a reshaped feature map, and instructing a subsequent convolutional layer to apply the 1×K or the K×1
(Continued)

convolution operation to the reshaped feature map, to thereby generate an adjusted feature map; and (b) instructing an output layer to refer to features on the adjusted feature map or its processed feature map, and instructing a loss layer to calculate losses by referring to an output from the output layer and its corresponding GT.

24 Claims, 9 Drawing Sheets

(51) Int. Cl.
  *G06F 11/34* (2006.01)
  *G06F 17/15* (2006.01)
  *G06F 13/378* (2006.01)

(56) References Cited

U.S. PATENT DOCUMENTS

| | | | | |
|---|---|---|---|---|
| 2018/0089564 | A1* | 3/2018 | Tate | G06N 3/0454 |
| 2018/0259970 | A1* | 9/2018 | Wang | G05D 1/0231 |
| 2019/0114391 | A1* | 4/2019 | Jaganathan | G06N 3/0472 |
| 2019/0114544 | A1* | 4/2019 | Sundaram | G06K 9/6257 |
| 2020/0012940 | A1* | 1/2020 | Liu | H04N 7/0135 |
| 2020/0026965 | A1* | 1/2020 | Guo | G06K 9/00986 |

OTHER PUBLICATIONS

Ben-Nun, T., & Hoefler, T. (2018). Demystifying Parallel and Distributed Deep Learning: An In-Depth Concurrency Analysis. arXiv preprint arXiv:1802.09941v2 last revised Sep. 15, 2018 (Year: 2018).*

Park, S. S., Hong, J. H., & Chung, K. S. (Aug. 2017). Modified convolution neural network for highly effective parallel processing. In 2017 IEEE International Conference on Information Reuse and Integration (IRI) (pp. 325-331). IEEE. (Year: 2017).*

Alom, M. Z., Taha, T. M., Yakopcic, C., Westberg, S., Sidike, P., Nasrin, M. S., . . . & Asari, V. K. (2018). The history began from alexnet: A comprehensive survey on deep learning approaches. arXiv preprint arXiv:1803.01164. (Year: 2018).*

Tseng, K. L., Lin, Y. L., Hsu, W., & Huang, C. Y. (2017). Joint sequence learning and cross-modality convolution for 3d biomedical segmentation. In Proceedings of the IEEE conference on Computer Vision and Pattern Recognition (pp. 6393-6400). (Year: 2017).*

Salvaris, M., Dean, D., & Tok, W. H. (2018). Deep Learning with Azure. (Year: 2018).*

Kim, S. Y., Lim, J., Na, T., & Kim, M. (2018). 3DSRnet: Video Super-resolution using 3D Convolutional Neural Networks. arXiv preprint arXiv:1812.09079. (Year: 2018).* https://blog.yani.lo/filter-group-tutorial/; A Tutorial on Filter Groups (Grouped Convolution); May 11, 2020.

Xie, Saining, et al. "Aggregated residual transformations for deep neural networks." Proceedings of the IEEE conference on computer vision and pattern recognition. 2017.

Zhang, Xiangyu, et al. "Shufflenet: An extremely efficient convolutional neural network for mobile devices." Proceedings of the IEEE conference on computer vision and pattern recognition 2018.

Cohen, Taco, and Max Welling. "Group equivariant convolutional networks." International conference on machine learning. 2016.

Office Action dated Oct. 26, 2021, in corresponding Indian patent Application No. 202014000529, 8 pages.

* cited by examiner

LEARNING METHOD AND LEARNING DEVICE FOR CNN USING 1XK OR KX1 CONVOLUTION TO BE USED FOR HARDWARE OPTIMIZATION, AND TESTING METHOD AND TESTING DEVICE USING THE SAME

FIELD OF THE DISCLOSURE

The present disclosure relates to a method for learning parameters of a CNN using a 1×K convolution operation or a K×1 convolution operation to be used for hardware optimization; and more particularly, to the method for learning the parameters of the CNN using the 1×K convolution operation or the K×1 convolution operation, including steps of: (a) if at least one training image is acquired, instructing a reshaping layer to two-dimensionally concatenate each of features in each group comprised of each corresponding K channels among all channels of the training image or its processed feature map, to thereby generate a reshaped feature map, and instructing a subsequent convolutional layer to apply the 1×K convolution operation or the K×1 convolution operation to the reshaped feature map, to thereby generate an adjusted feature map whose volume is adjusted; and (b) instructing an output layer to generate at least one output by referring to features on the adjusted feature map or its processed feature map, and instructing a loss layer to calculate one or more losses by referring to the output and its corresponding at least one ground truth, to thereby learn at least part of parameters of the subsequent convolutional layer by backpropagating the losses, and a learning device, a testing method, and a testing device using the same.

BACKGROUND OF THE DISCLOSURE

Deep Convolution Neural Networks (Deep CNNs) are at the heart of the remarkable development in deep learning. CNNs have already been used in the 90's to solve the problems of character recognition, but their use has become as widespread as it is now thanks to recent research. These deep CNNs won the 2012 ImageNet image classification tournament, crushing other competitors. Then, the convolutional neural network became a very useful tool in the field of the machine learning.

The CNN may include a feature extractor which extracts features from an image, and a feature classifier which detects objects in the image or recognizes the objects in the image by referring to the features extracted by the feature extractor.

The feature extractor of the CNN may include convolutional layers, and the feature classifier may include one or more FC layers capable of applying fully connected operations to the features extracted by the feature extractor.

The convolutional layers are the most important part of the CNN which do almost all of the operation.

The convolutional layers extract features from a local receptive field by further using information on pixels nearby. However, a characteristic of filters of the convolutional layers are linear, thus the filters cannot extract non-linear features very well. This problem can be resolved by increasing the number of feature maps, but then the amount of computation also increases.

As such, a 1×1 convolutional layer has been used to reduce the dimension of the feature maps to minimize computational load.

The 1×1 convolutional layer can extract like features from multiple feature maps, and as a result, can reduce the number of the feature maps, thus can reduce the amount of computation.

Also, the reduction of the amount of computation gives room for deepening the neural network.

Also, the 1×1 convolutional layer is used for image segmentation, or used in place of the FC layers for the feature extractor.

Herein, the inventors of the present disclosure propose a CNN capable of reducing the amount of the convolution operation more effectively, compared to convolution operation of the 1×1 convolutional layer.

SUMMARY OF THE DISCLOSURE

It is an object of the present disclosure to solve all the aforementioned problems.

It is another object of the present disclosure to provide a CNN capable of reducing amount of convolution operation more efficiently.

It is still another object of the present disclosure to provide the CNN capable of extracting features on an image more efficiently by the convolution operation.

In accordance with one aspect of the present disclosure, there is provided a method for learning parameters of a CNN using a 1×K convolution operation or a K×1 convolution operation, including steps of: (a) a learning device, if at least one training image is acquired, instructing a reshaping layer to two-dimensionally concatenate each of features in each group comprised of each corresponding K channels among all channels of the training image or its processed feature map, to thereby generate a reshaped feature map, and instructing a subsequent convolutional layer to apply the 1×K convolution operation or the K×1 convolution operation to the reshaped feature map, to thereby generate an adjusted feature map whose volume is adjusted; and (b) the learning device instructing an output layer to generate at least one output by referring to features on the adjusted feature map or its processed feature map, and instructing a loss layer to calculate one or more losses by referring to the output and its corresponding at least one ground truth, to thereby learn at least part of parameters of the subsequent convolutional layer by backpropagating the losses.

As one example, at the step of (a), the learning device, if the number of channels of the training image or its processed feature map is not a multiple of K, instructs the reshaping layer to add at least one dummy channel to the channels of the training image or its processed feature map such that the number of the channels including the at least one dummy channel is a multiple of K, and to concatenate said each of features in said each group comprised of said each corresponding K channels among said all channels, including the at least one dummy channel, of the training image or its processed feature map.

As one example, supposing that a width of the training image or its processed feature map is W and a height thereof is H, and that the number of channels thereof is L, at the step of (a), the learning device instructs the reshaping layer to generate the reshaped feature map having a width of W, a height of H·K, and a channel of $$\mathrm{CEIL}\left(\frac{L}{K}\right).$$

As one example, supposing that the number of kernels of the subsequent convolutional layer is M, at the step of (a), the learning device instructs the subsequent convolutional layer to apply a 1×K convolution operation to the reshaped feature map, to thereby generate the adjusted feature map having a volume of W·H·M, resulting from a width of W, a height of H, and a channel of M.

As one example, supposing that a width of the training image or its processed feature map is W and a height thereof is H, and that the number of channels thereof is L, at the step of (a), the learning device instructs the reshaping layer to generate the reshaped feature map having a width of W·K, a height of H, and a channel of $$\text{CEIL}\left(\frac{L}{K}\right).$$

As one example, supposing that the number of kernels of the subsequent convolutional layer is M, at the step of (a), the learning device instructs the subsequent convolutional layer to apply a K×1 convolution operation to the reshaped feature map, to thereby generate the adjusted feature map having a volume of W·H·M, resulting from a width of W, a height of H, and a channel of M.

As one example, supposing that a width of the training image or its processed feature map is W and a height thereof is H, and that the number of channels thereof is L, at the step of (a), the learning device instructs the reshaping layer to (i) generate the reshaped feature map having a width of W, a height of H·K, and a channel of $$\text{CEIL}\left(\frac{L}{K}\right),$$

or (ii) generate the reshaped feature map having a width of W·K, a height of H, and a channel of $$\text{CEIL}\left(\frac{L}{K}\right),$$

and, if a size of a final part of the reshaped feature map on a $$\left\{\text{CEIL}\left(\frac{L}{K}\right)\right\}\text{-th}$$

channel is different from a size of a width of W and a height of H·K, the learning device instructs the reshaping layer to add at least one zero padding such that the final part of the reshaped feature map on the $$\left\{\text{CEIL}\left(\frac{L}{K}\right)\right\}\text{-th}$$

channel has the width of W and the height of H·K, or wherein, if the size of the final part of the reshaped feature map on the $$\left\{\text{CEIL}\left(\frac{L}{K}\right)\right\}\text{-th}$$

channel is different from a size of a width of W·K and a height of H, the learning device instructs the reshaping layer to add at least one zero padding such that the final part of the reshaped feature map on the $$\left\{\text{CEIL}\left(\frac{L}{K}\right)\right\}\text{-th}$$

channel has the width of W·K and the height of H.

In accordance with another aspect of the present disclosure, there is provided a method for testing a CNN using a 1×K convolution operation or a K×1 convolution operation, including steps of: (a) on condition that a learning device (i) has instructed a reshaping layer to two-dimensionally concatenate each of features for training in each group comprised of each corresponding K channels among all channels of at least one training image or its processed feature map, to thereby generate a reshaped feature map for training, and has instructed a subsequent convolutional layer to apply the 1×K convolution operation or the K×1 convolution operation to the reshaped feature map for training, to thereby generate an adjusted feature map for training whose volume is adjusted, and (ii) has instructed an output layer to generate at least one output for training by referring to features on the adjusted feature map for training or its processed feature map, and has instructed a loss layer to calculate one or more losses by referring to the output for training and its corresponding at least one ground truth, to thereby learn at least part of parameters of the subsequent convolutional layer by backpropagating the losses; a testing device, if at least one test image is acquired, instructing the reshaping layer to two-dimensionally concatenate each of features for testing in each group comprised of each corresponding K channels among all channels of the test image or its processed feature map, to thereby generate a reshaped feature map for testing, and instructing the subsequent convolutional layer to apply the 1×K convolution operation or the K×1 convolution operation to the reshaped feature map for testing, to thereby generate an adjusted feature map for testing whose volume is adjusted; and (b) the testing device instructing the output layer to generate at least one output for testing by referring to features on the adjusted feature map for testing or its processed feature map.

As one example, at the step of (a), the testing device, if the number of channels of the test image or its processed feature map is not a multiple of K, instructs the reshaping layer to add at least one dummy channel to the channels of the test image or its processed feature map such that the number of the channels including the at least one dummy channel is a multiple of K, and to concatenate said each of features in said each group comprised of said each corresponding K channels among said all channels, including the at least one dummy channel, of the test image or its processed feature map.

As one example, supposing that a width of the test image or its processed feature map is W and a height thereof is H, and that the number of channels thereof is L, at the step of (a), the testing device instructs the reshaping layer to generate the reshaped feature map for testing having a width of W, a height of H·K, and a channel of $$CEIL\left(\frac{L}{K}\right).$$

As one example, supposing that the number of kernels of the subsequent convolutional layer is M, at the step of (a), the testing device instructs the subsequent convolutional layer to apply a 1×K convolution operation to the reshaped feature map for testing, to thereby generate the adjusted feature map for testing having a volume of W·H·M, resulting from a width of W, a height of H, and a channel of M.

As one example, supposing that a width of the test image or its processed feature map is W and a height thereof is H, and that the number of channels thereof is L, at the step of (a), the testing device instructs the reshaping layer to generate the reshaped feature map for testing having a width of W·K, a height of H, and a channel of $$CEIL\left(\frac{L}{K}\right).$$

As one example, supposing that the number of kernels of the subsequent convolutional layer is M, at the step of (a), the testing device instructs the subsequent convolutional layer to apply a K×1 convolution operation to the reshaped feature map for testing, to thereby generate the adjusted feature map for testing having a volume of W·H·M, resulting from a width of W, a height of H, and a channel of M.

As one example, supposing that a width of the test image or its processed feature map is W and a height thereof is H, and that the number of channels thereof is L, at the step of (a), the testing device instructs the reshaping layer to (i) generate the reshaped feature map for testing having a width of W, a height of H·K, and a channel of $$CEIL\left(\frac{L}{K}\right),$$

or (ii) generate the reshaped feature map for testing having a width of W·K, a height of H, and a channel of $$CEIL\left(\frac{L}{K}\right),$$

and, if a size of a final part of the reshaped feature map for testing on a $$\left\{CEIL\left(\frac{L}{K}\right)\right\}-th$$

channel is different from a size of a width of W and a height of H·K, the testing device instructs the reshaping layer to add at least one zero padding such that the final part of the reshaped feature map for testing on the $$\left\{CEIL\left(\frac{L}{K}\right)\right\}-th$$

channel has the width of W and the height of H·K, or wherein, if the size of the final part of the reshaped feature map for testing on the $$\left\{CEIL\left(\frac{L}{K}\right)\right\}-th$$

channel is different from a size of a width of W·K and a height of H, the testing device instructs the reshaping layer to add at least one zero padding such that the final part of the reshaped feature map for testing on the $$\left\{CEIL\left(\frac{L}{K}\right)\right\}-th$$

channel has the width of W·K and the height of H.

In accordance with still another aspect of the present disclosure, there is provided a learning device for learning parameters of a CNN using a 1×K convolution operation or a K×1 convolution operation, including: at least one memory that stores instructions; and at least one processor configured to execute the instructions to: perform processes of (I) instructing a reshaping layer to two-dimensionally concatenate each of features in each group comprised of each corresponding K channels among all channels of at least one training image or its a processed feature map, to thereby generate a reshaped feature map, and instructing a subsequent convolutional layer to apply the 1×K convolution operation or the K×1 convolution operation to the reshaped feature map, to thereby generate an adjusted feature map whose volume is adjusted, and (II) instructing an output layer to generate at least one output by referring to features on the adjusted feature map or its processed feature map, and instructing a loss layer to calculate one or more losses by referring to the output and its corresponding at least one ground truth, to thereby learn at least part of parameters of the subsequent convolutional layer by backpropagating the losses.

As one example, at the process of (I), the processor, if the number of channels of the training image or its the pre-processed feature map is not a multiple of K, instructs the reshaping layer to add at least one dummy channel to the channels of the training image or its processed feature map such that the number of the channels including the at least one dummy channel is a multiple of K, and to concatenate said each of features in said each group comprised of said each corresponding K channels among said all channels, including the at least one dummy channel, of the training image or its the pre-processed feature map.

As one example, supposing that a width of the training image or its pre-processed feature map is W and a height thereof is H, and that the number of channels thereof is L, at the process of (I), the processor instructs the reshaping layer to generate the reshaped feature map having a width of W, a height of H·K, and a channel of $$CEIL\left(\frac{L}{K}\right).$$

As one example, supposing that the number of kernels of the subsequent convolutional layer is M, at the process of (I), the processor instructs the subsequent convolutional layer to apply a 1×K convolution operation to the reshaped feature map, to thereby generate the adjusted feature map having a volume of W·H·M, resulting from a width of W, a height of H, and a channel of M.

As one example, supposing that a width of the training image or its the pre-processed feature map is W and a height thereof is H, and that the number of channels thereof is L, at the process of (I), the processor instructs the reshaping layer to generate the reshaped feature map having a width of W·K, a height of H, and a channel of $$CEIL\left(\frac{L}{K}\right).$$

As one example, supposing that the number of kernels of the subsequent convolutional layer is M, at the process of (I), the processor instructs the subsequent convolutional layer to apply a K×1 convolution operation to the reshaped feature map, to thereby generate the adjusted feature map having a volume of W·H·M, resulting from a width of W, a height of H, and a channel of M.

As one example, supposing that a width of the training image or its the pre-processed feature map is W and a height thereof is H, and that the number of channels thereof is L, at the process of (I), the processor instructs the reshaping layer to (i) generate the reshaped feature map having a width of W, a height of H·K, and a channel of $$CEIL\left(\frac{L}{K}\right),$$

or (ii) generate the reshaped feature map having a width of W·K, a height of H, and a channel of $$CEIL\left(\frac{L}{K}\right),$$

and, if a size of a final part of the reshaped feature map on a $$\left\{CEIL\left(\frac{L}{K}\right)\right\}\text{-}th$$

channel is different from a size of a width of W and a height of H·K, the processor instructs the reshaping layer to add at least one zero padding such that the final part of the reshaped feature map on the $$\left\{CEIL\left(\frac{L}{K}\right)\right\}\text{-}th$$

channel has the width of W and the height of H·K, or wherein, if the size of the final part of the reshaped feature map on the $$\left\{CEIL\left(\frac{L}{K}\right)\right\}\text{-}th$$

channel is different from a size of a width of W·K and a height of H, the processor instructs the reshaping layer to add at least one zero padding such that the final part of the reshaped feature map on the $$\left\{CEIL\left(\frac{L}{K}\right)\right\}\text{-}th$$

channel has the width of W·K and the height of H.

In accordance with still yet another aspect of the present disclosure, there is provided a testing device for testing a CNN using a 1×K convolution operation or a K×1 convolution operation, including: at least one memory that stores instructions; and at least one processor, on condition that a learning device (i) has instructed a reshaping layer to two-dimensionally concatenate each of features for training in each group comprised of each corresponding K channels among all channels of at least one training image or its processed feature map, to thereby generate a reshaped feature map for training, and has instructed a subsequent convolutional layer to apply the 1×K convolution operation or the K×1 convolution operation to the reshaped feature map for training, to thereby generate an adjusted feature map for training whose volume is adjusted, and (ii) has instructed an output layer to generate at least one output for training by referring to features on the adjusted feature map for training or its processed feature map, and has instructed a loss layer to calculate one or more losses by referring to the output for training and its corresponding at least one ground truth, to thereby learn at least part of parameters of the subsequent convolutional layer by backpropagating the losses; configured to execute the instructions to: perform processes of (I) instructing the reshaping layer to two-dimensionally concatenate each of features for testing in each group comprised of each corresponding K channels among all channels of at least one test image or its processed feature map, to thereby generate a reshaped feature map for testing, and instructing the subsequent convolutional layer to apply the 1×K convolution operation or the K×1 convolution operation to the reshaped feature map for testing, to thereby generate an adjusted feature map for testing whose volume is adjusted, and (II) instructing the output layer to generate at least one output for testing by referring to features on the adjusted feature map for testing or its processed feature map.

As one example, at the process of (I), the processor, if the number of channels of the test image or its processed feature map is not a multiple of K, instructs the reshaping layer to add at least one dummy channel to the channels of the test image or its processed feature map such that the number of the channels including the at least one dummy channel is a multiple of K, and to concatenate said each of features in said each group comprised of said each corresponding K channels among said all channels, including the at least one dummy channel, of the test image or its processed feature map.

As one example, supposing that a width of the test image or its processed feature map is W and a height thereof is H, and that the number of channels thereof is L, at the process of (I), the processor instructs the reshaping layer to generate the reshaped feature map for testing having a width of W, a height of H·K, and a channel of $$CEIL\left(\frac{L}{K}\right).$$

As one example, supposing that the number of kernels of the subsequent convolutional layer is M, at the process of (I), the processor instructs the subsequent convolutional layer to apply a 1×K convolution operation to the reshaped feature map for testing, to thereby generate the adjusted feature map for testing having a volume of W·H·M, resulting from a width of W, a height of H, and a channel of M.

As one example, supposing that a width of the test image or its processed feature map is W and a height thereof is H, and that the number of channels thereof is L, at the process of (I), the processor instructs the reshaping layer to generate the reshaped feature map for testing having a width of W·K, a height of H, and a channel of $$CEIL\left(\frac{L}{K}\right).$$

As one example, supposing that the number of kernels of the subsequent convolutional layer is M, at the process of (I), the processor instructs the subsequent convolutional layer to apply a K×1 convolution operation to the reshaped feature map for testing, to thereby generate the adjusted feature map for testing having a volume of W·H·M, resulting from a width of W, a height of H, and a channel of M.

As one example, supposing that a width of the test image or its processed feature map is W and a height thereof is H, and that the number of channels thereof is L, at the process of (I), the processor instructs the reshaping layer to (i) generate the reshaped feature map for testing having a width of W, a height of H·K, and a channel of $$CEIL\left(\frac{L}{K}\right),$$

or (ii) generate the reshaped feature map for testing having a width of W·K, a height of H, and a channel of $$CEIL\left(\frac{L}{K}\right),$$

and, if a size of a final part of the reshaped feature map for testing on a $$\left\{CEIL\left(\frac{L}{K}\right)\right\}\text{-}th$$

channel is different from a size of a width of W and a height of H·K, the processor instructs the reshaping layer to add at least one zero padding such that the final part of the reshaped feature map for testing on the $$\left\{CEIL\left(\frac{L}{K}\right)\right\}\text{-}th$$

channel has the width of W and the height of H·K, or wherein, if the size of the final part of the reshaped feature map for testing on the $$\left\{CEIL\left(\frac{L}{K}\right)\right\}\text{-}th$$

channel is different from a size of a width of W·K and a height of H, the processor instructs the reshaping layer to add at least one zero padding such that the final part of the reshaped feature map for testing on the $$\left\{CEIL\left(\frac{L}{K}\right)\right\}\text{-}th$$

channel has the width of W·K and the height of H.

In addition, recordable media that are readable by a computer for storing a computer program to execute the method of the present disclosure is further provided.

BRIEF DESCRIPTION OF THE DRAWINGS

The above and other objects and features of the present disclosure will become apparent from the following description of preferred embodiments given in conjunction with the accompanying drawings.

The following drawings to be used to explain example embodiments of the present disclosure are only part of example embodiments of the present disclosure and other drawings can be obtained based on the drawings by those skilled in the art of the present disclosure without inventive work.

DETAILED DESCRIPTION OF THE PREFERRED EMBODIMENTS

Figure 1:
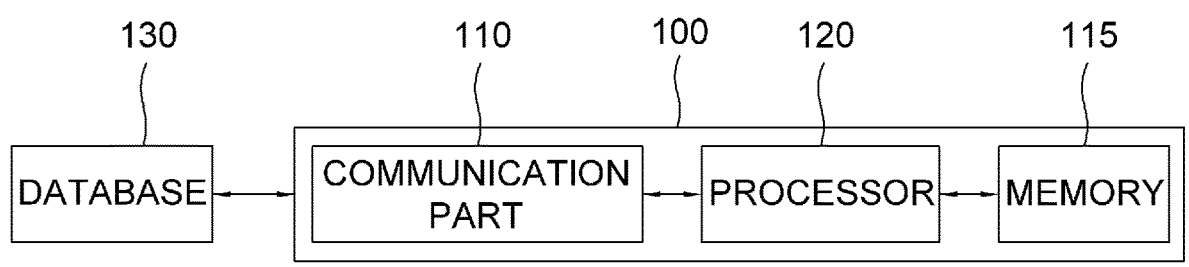
FIG. 1 is a drawing schematically illustrating a learning device for learning a CNN using a 1×K or a K×1 convolution operation in accordance with one example embodiment of the present disclosure.

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the disclosure.

Besides, in the detailed description and claims of the present disclosure, a term "include" and its variations are not intended to exclude other technical features, additions, components or steps. Other objects, benefits, and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

To allow those skilled in the art to the present disclosure to be carried out easily, the example embodiments of the present disclosure by referring to attached diagrams will be explained in detail as shown below.

FIG. 1 is a drawing schematically illustrating a learning device of a CNN using a 1×K or a K×1 convolution operation in accordance with one example embodiment of the present disclosure, and by referring to FIG. 1, the learning device 100 may include a communication part 110 and a processor 120.

First, the communication part 110 may receive at least one training image.

Herein, the training image may be stored in a database 130, and the database 130 may store at least one ground truth of class information on each of one or more objects and at least one ground truth of location information on each of the objects, corresponding to the training images.

In addition, the learning device may further include a memory 115 capable of storing computer readable instructions for performing following processes. As one example, the processor, the memory, a medium, etc. may be integrated with an integrated processor.

Next, the processor 120 may perform processes of instructing a reshaping layer to two-dimensionally concatenate each of features in each group comprised of each corresponding K channels among all channels of the training image or its processed feature map, to thereby generate a reshaped feature map, and instructing a subsequent convolutional layer to apply the 1×K convolution operation or the K×1 convolution operation to the reshaped feature map, to thereby generate an adjusted feature map whose volume is adjusted. Herein, said processed feature map is a feature map generated by at least one of (i) a method of applying one or more convolution operations to the training image, (ii) that of applying subsequent operations, e.g., a batch normalization operation, an activation operation, a pooling operation, to a result of said method of (i), and (iii) that of applying additional convolution operations to a result of said method of (ii). Then, the processor 120 may instruct an output layer to generate at least one output by referring to features on the adjusted feature map or its processed feature map, and may instruct a loss layer to calculate one or more losses by referring to the output and its corresponding at least one ground truth, to thereby learn at least part of parameters of the subsequent convolutional layer by back-propagating the losses.

Herein, the learning device 100 in accordance with one example of the present disclosure may be a computing device and may be any digital device with a processor capable of computation. For reference, although FIG. 1 shows the single learning device 100, the scope of the present disclosure is not limited thereto. For example, the learning device may be configured as several devices to perform its functions.

Figure 2:
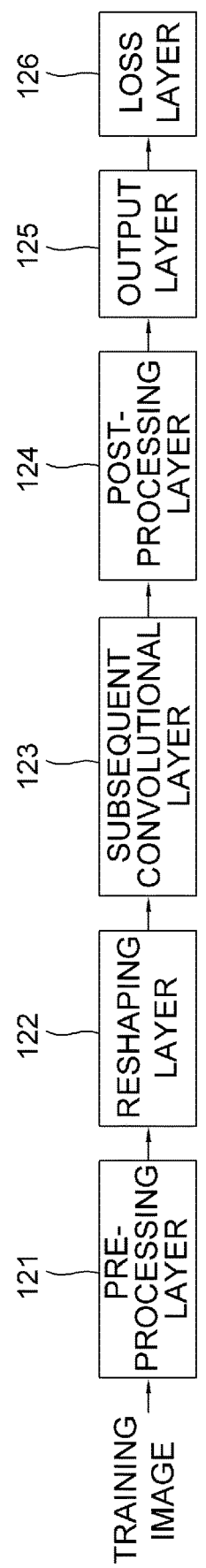
FIG. 2 is a drawing schematically illustrating a learning method for learning the CNN using the 1×K or the K×1 convolution operation in accordance with one example embodiment of the present disclosure.

A method for learning parameters of the CNN using the 1×K or the K×1 convolution operation by using the learning device 100 in accordance with one example embodiment of the present disclosure is described by referring to FIG. 2 as follows.

First of all, if the training image is inputted, the learning device 100 may instruct a pre-processing layer 121 to pre-process the training image, to thereby generate the processed feature map.

Herein, the pre-processing layer 121 may include at least one of a convolutional layer, a batch normalization layer, an activation layer, and a pooling layer, and may generate the processed feature map. Herein, the processed feature map is a feature map generated by at least one of (i) a method of applying the convolution operations to the training image, (ii) that of applying subsequent operations, e.g., the batch normalization operation, the activation operation, the pooling operation, to a result of said method of (i), and (iii) that of applying additional convolution operations to a result of said method of (ii). However, the scope of the pre-processing layer 121 is not limited thereto, that is, the pre-processing layer 121 may include each layer which forms the CNN for image processing.

Next, the learning device 100 may instruct a reshaping layer 122 to two-dimensionally concatenate each of features in each group comprised of each corresponding K channels among all channels of the training image or its processed feature map, to thereby generate the reshaped feature map. Herein, the learning device 100 may directly input the training image into the reshaping layer 122, without instructing the pre-processing layer 121 to pre-process the training image.

Herein, if the number of channels of the training image or its processed feature map is not a multiple of K, the learning device 100 may instruct the reshaping layer 122 to add at least one dummy channel to the channels corresponding to each of the pixels such that the number of the channels including the at least one dummy channel is a multiple of K, and to concatenate said each of features in said each group comprised of said each corresponding K channels among said all channels, including the at least one dummy channel, of the training image or its processed feature map.

That is, supposing that a width of the training image or its processed feature map is W and a height thereof is H, and that the number of channels thereof is L, the learning device 100 may instruct the reshaping layer 122 to (i) generate the reshaped feature map having a width of W, a height of H·K, and a channel of $$CEIL\left(\frac{L}{K}\right),$$

or (ii) generate the reshaped feature map having a width of W·K, a height of H, and a channel of $$CEIL\left(\frac{L}{K}\right).$$

Further, if a size of a final part of the reshaped feature map on a $$\left\{CEIL\left(\frac{L}{K}\right)\right\}-th$$

channel is different from the size of the width of W and the height of H·K, the learning device 100 may instruct the reshaping layer 122 to add at least one zero padding such that the final part of the reshaped feature map on the $$\left\{CEIL\left(\frac{L}{K}\right)\right\}-th$$

channel has the width of W and the height of H·K, or if the size of the final part of the reshaped feature map on the $$\left\{CEIL\left(\frac{L}{K}\right)\right\}-th$$

channel is different from a size of a width of W·K and a height of H, the learning device 100 may instruct the reshaping layer 122 to add at least one zero padding such that the final part of the reshaped feature map on the $$\left\{CEIL\left(\frac{L}{K}\right)\right\}-th$$

channel has the width of W·K and the height of H.

Figure 3:
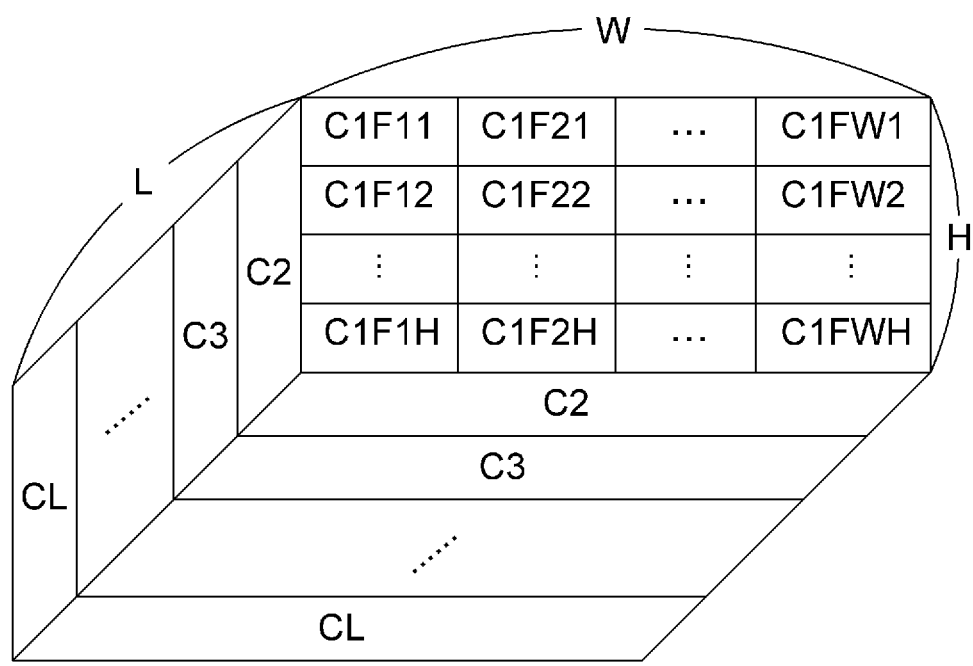
FIG. 3 is a drawing schematically illustrating a training image or its processed feature map for learning the CNN using the 1×K or the K×1 convolution operation in accordance with one example embodiment of the present disclosure.

As one example, by referring to FIG. 3, supposing that a width of the training image or its processed feature map 300 is W and a height thereof is H, and that the number of channels thereof is L, each of features, corresponding to said each of pixels, on a first channel C1 of the training image or its processed feature map 300 may be represented by C1F11, . . . , C1F22, . . . , and C1FWH. Also, each of features, corresponding to said each of pixels, on other channels C2, C3, . . . , and CL of the training image or its processed feature map 300 may be represented in a similar way.

Figure 4A:
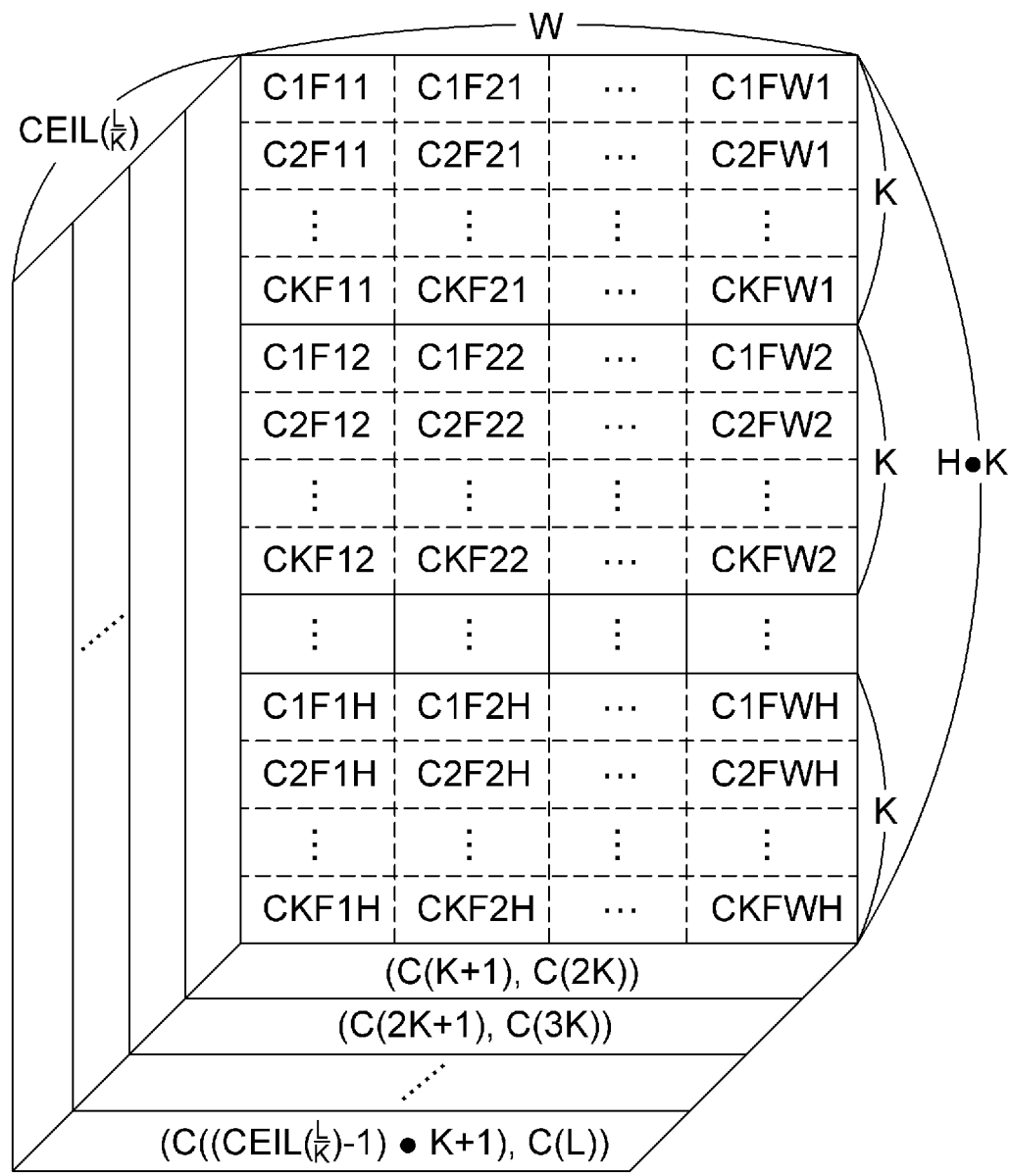
FIGS. 4A and 4B are drawings schematically illustrating (i) a reshaped feature map generated from reshaping the training image or its processed feature map and (ii) an adjusted feature map generated from applying the 1×K convolution operation to the reshaped feature map, respectively, in accordance with one example embodiment of the present disclosure.

Then, by referring to FIGS. 3 and 4A, features C1F11, C2F11, . . . , and CKF11 of K channels corresponding to the pixel C1F11 on the training image or its processed feature map 300 in FIG. 3 may be concatenated, features C1F21, C2F21, . . . , and CKF21 of K channels corresponding to the pixel C1F21 on the training image or its processed feature map 300 may be concatenated, . . . , features C1FWH, C2FWH, . . . , and CKFWH of K channels corresponding to the pixel C1FWH on the training image or its processed feature map 300 may be concatenated, and the like. That is, features of each K channels corresponding to every pixel on the training image or its processed feature map 300 may be concatenated to generate the reshaped feature map 400A.

Herein, the reshaped feature map 400A may have a width of W, a height of H·K, and a channel of $$CEIL\left(\frac{L}{K}\right).$$

Also, each channel of the reshaped feature map 400A may correspond to each group comprised of K channels of the training image or its processed feature map 300. That is, a first channel of the reshaped feature map 400A may correspond to a first channel to a K-th channel of the training image or its processed feature map 300, and a second channel of the reshaped feature map 400A may correspond to a (K+1)-th channel to a (2·K)-th channel of the training image or its processed feature map 300. Also, a $$CEIL\left(\frac{L}{K}\right)-th$$

channel of the reshaped feature map 400A may correspond to a $$\left\{\left(CEIL\left(\frac{L}{K}\right)-1\right)\cdot K+1\right\}-th$$

channel to an L-th channel of the training image or its processed feature map 300.

Then, the learning device 100 may instruct the subsequent convolutional layer 123 to apply the 1×K convolution operation to the reshaped feature map 400A, to thereby generate the adjusted feature map 400B whose volume is adjusted.

Figure 4B:
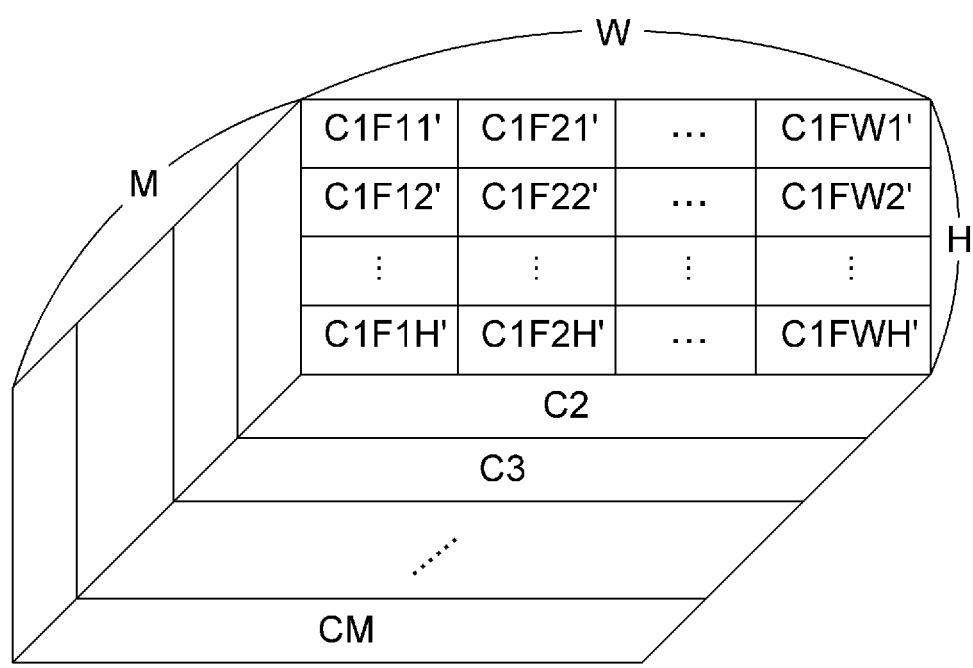

As one example, by referring to FIGS. 4A and 4B, a feature of a pixel C1F11' is generated by applying the 1×K convolution operation to C1F11, C2F11, and CKF11, corresponding to a size of 1×K, of the reshaped feature map 400A in FIG. 4A, a feature of a pixel C1F22' is generated by applying the 1×K convolution operation to C1F22, C2F22, . . . , and CKF22, a feature of a pixel C1FWH' is generated by applying the 1×K convolution operation to C1FWH, C2FWH, ..., and CKFWH, and the like. Herein, the size of 1×K may be a kernel size of the convolutional layers. As a result, by applying the 1×K convolution operation to the reshaped feature map 400A in FIG. 4A, the adjusted feature map 400B having a width of W and a height of H as in FIG. 4B may be generated. Therefore, compared to the 1×1 convolution operation on the training image or its processed feature map 300, the amount of computation becomes 1/K by generating the reshaped feature map 400A and performing the 1×K convolution operation, and thus the speed of the convolution operation is increased by a factor of K. Herein, the number of channels of the adjusted feature map 400B may correspond to the number of kernels, i.e., the number of the filters, of the subsequent convolutional layer 123 performing the 1×K convolution operation. As one example, if the number of the kernels of the subsequent convolutional layer 123 is M, the number of the channels of the adjusted feature map 400B may be M.

The method using the 1×K convolution operation is described above, however, features of K channels of the training image or its processed feature map 300 may be concatenated in a direction of a width and then the K×1 convolution operation may be performed.

Figure 5A:
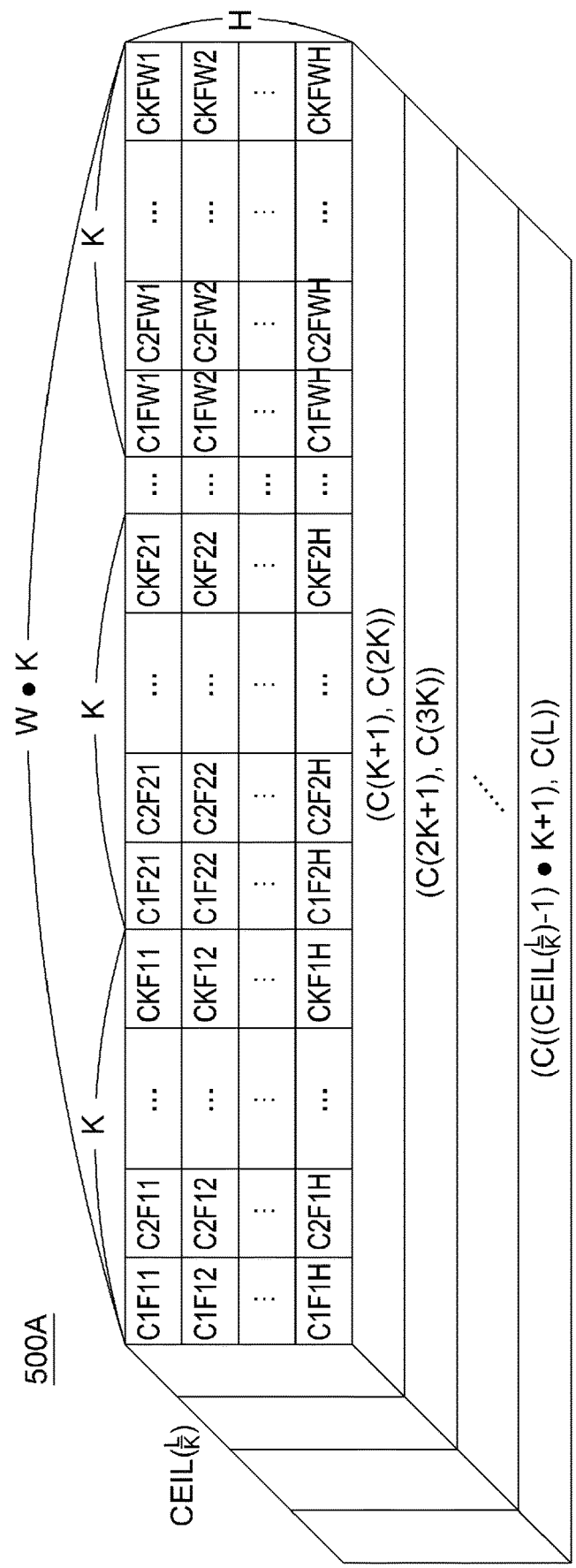
FIGS. 5A and 5B are drawings schematically illustrating (i) a reshaped feature map generated from reshaping the training image or its processed feature map and (ii) an adjusted feature map generated from applying the K×1 convolution operation to the reshaped feature map, respectively, in accordance with one example embodiment of the present disclosure.

Then, by referring to FIGS. 3 and 5A, the features C1F11, C2F11, ..., and CKF11 of K channels corresponding to the pixel C1F11 on the training image or its processed feature map 300 in FIG. 3 may be concatenated in a direction of a width, the features C1F12, C2F12, and CKF12 of K channels corresponding to the pixel C1F12 on the training image or its processed feature map 300 may be concatenated in the direction of the width, ..., the features C1FWH, C2FWH, ..., and CKFWH of K channels corresponding to the pixel C1FWH on the training image or its processed feature map 300 may be concatenated in the direction of the width, and the like. That is, the features of each K channels corresponding to every pixel on the training image or its processed feature map 300 may be concatenated in the direction of the width to generate the reshaped feature map 500A.

Herein, the reshaped feature map 500A may have a width of W·K, a height of H, and a channel of $$CEIL\left(\frac{L}{K}\right).$$

Also, each channel of the reshaped feature map 500A may correspond to each group comprised of K channels of the training image or its processed feature map 300. That is, a first channel of the reshaped feature map 500A may correspond to a first channel to a K-th channel of the training image or its processed feature map 300, and a second channel of the reshaped feature map 500A may correspond to a (K+1)-th channel to a (2·K)-th channel of the training image or its processed feature map 300. Also, a $$CEIL\left(\frac{L}{K}\right)-th$$

channel of the reshaped feature map 500A may correspond to a $$\left\{\left(CEIL\left(\frac{L}{K}\right)-1\right)\cdot K+1\right\}-th$$

channel to an L-th channel of the training image or its processed feature map 300.

Then, the learning device 100 may instruct the subsequent convolutional layer 123 to apply the K×1 convolution operation to the reshaped feature map 500A, to thereby generate the adjusted feature map 500B whose volume is adjusted.

Figure 5B:
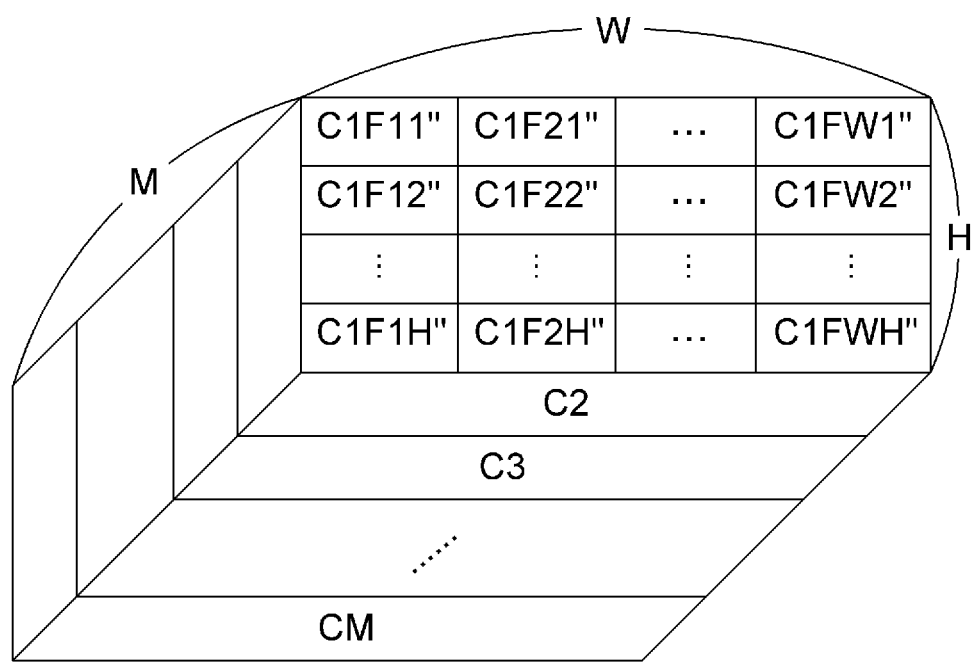

As one example, by referring to FIGS. 5A and 5B, a feature of a pixel C1F11″ is generated by applying the K×1 convolution operation to C1F11, C2F11, ..., and CKF11, corresponding to a size of K×1, of the reshaped feature map 500A in FIG. 5A, a feature of a pixel C1F12″ is generated by applying the K×1 convolution operation to C1F12, C2F12, ..., and CKF12, ..., a feature of a pixel C1FWH″ is generated by applying the K a pixel C1FC1F11″ is generated by applying the KCKFWH, and the like. Herein, the size of K×1 may be a kernel size of the convolutional layers. As a result, by applying the K×1 convolution operation to the reshaped feature map 500A in FIG. 5A, the adjusted feature map 500B having a width of W and a height of H as in FIG. 5B may be generated.

Next, the learning device 100 may instruct a post-processing layer 124 to post-process the adjusted feature map 500B outputted from the subsequent convolutional layer 123. Herein, the post-processing layer 124 may include at least one of the convolutional layer, the batch normalization layer, the activation layer, the pooling layer, and an FC layer, and may generate probability information representing classified features of the adjusted feature map 500B or its processed feature map outputted from the subsequent convolutional layer 123. However, the scope of the post-processing layer 124 is not limited thereto, that is, the post-processing layer 124 may include each layer which forms the CNN for image processing.

Then, the learning device 100 may instruct an output layer 125 to generate at least one output by referring to features on the adjusted feature map 500B or its processed feature map, and may instruct a loss layer 126 to calculate one or more losses by referring to the output and its corresponding at least one ground truth, to thereby learn at least part of parameters of the subsequent convolutional layer 123 by backpropagating the losses. Herein, the learning device 100 may directly input the adjusted feature map 500B into the output layer 125, without instructing the post-processing layer 124 to post-process the adjusted feature map 500B.

Figure 6:
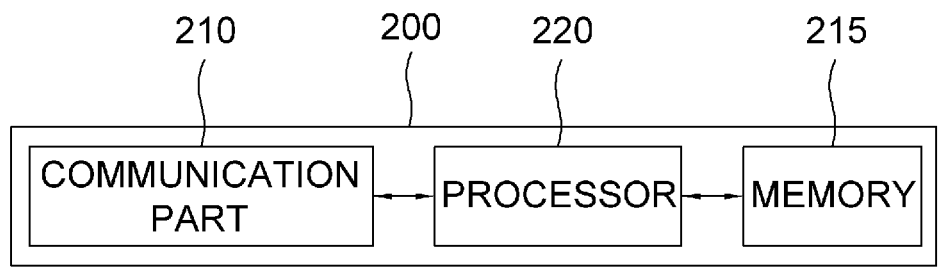
FIG. 6 is a drawing schematically illustrating a testing device for the CNN using the 1×K or the K×1 convolution operation in accordance with one example embodiment of the present disclosure.

FIG. 6 is a drawing schematically illustrating a testing device of the CNN using the 1×K or the K×1 convolution operation in accordance with one example embodiment of the present disclosure, and by referring to FIG. 6, the testing device 200 may include a communication part 210 and a processor 220.

In addition, the testing device may further include a memory 215 capable of storing computer readable instructions for performing following processes. As one example, the processor, the memory, a medium, etc. may be integrated with an integrated processor.

First, the communication part 210 may acquire or support another device to acquire at least one test image.

Herein, the CNN using the 1×K or the K×1 convolution operation in accordance with one example of the present disclosure may be assumed to have been learned by the learning method described by referring to FIGS. 2 to 5B.

For reference, in the description below, the phrase "for training" is added for terms related to the learning processes, and the phrase "for testing" is added for terms related to testing processes, to avoid possible confusion.

That is, if at least one training image has been acquired, the learning device may have performed processes of (a)

instructing the reshaping layer to two-dimensionally concatenate each of features in each group comprised of each corresponding K channels among all channels of the training image or its processed feature map, to thereby generate a reshaped feature map for training, and instructing the subsequent convolutional layer to apply the 1×K convolution operation or the K×1 convolution operation to the reshaped feature map for training, to thereby generate an adjusted feature map for training whose volume is adjusted. Herein, said processed feature map for training is a feature map generated by at least one of (i) a method of applying the convolution operations to the training image, (ii) that of applying subsequent operations, e.g., the batch normalization operation, the activation operation, the pooling operation, to a result of said method of (i), and (iii) that of applying additional convolution operations to a result of said method of (ii); (b) instructing the output layer to generate at least one output for training by referring to features on the adjusted feature map for training or its processed feature map, and instructing the loss layer to calculate one or more losses by referring to the output for training and its corresponding at least one ground truth, to thereby learn at least part of parameters of the subsequent convolutional layer by backpropagating the losses.

Next, the processor 220 may perform processes of instructing the reshaping layer to two-dimensionally concatenate each of features in each group comprised of each corresponding K channels among all channels of the test image or its processed feature map, to thereby generate a reshaped feature map for testing, and instructing the subsequent convolutional layer to apply the 1×K convolution operation or the K×1 convolution operation to the reshaped feature map for testing, to thereby generate an adjusted feature map for testing whose volume is adjusted. Herein, said processed feature map for testing is a feature map generated by at least one of (i) a method of applying the convolution operations to the test image, (ii) that of applying subsequent operations, e.g., the batch normalization operation, the activation operation, the pooling operation, to a result of said method of (i), and (iii) that of applying additional convolution operations to a result of said method of (ii). Then, the processor 220 may instruct the output layer to generate at least one output for testing by referring to features on the adjusted feature map for testing or its processed feature map.

Herein, the testing device 200 in accordance with one example embodiment of the present disclosure may be a computing device and may be any device with a processor capable of computation. For reference, although FIG. 6 shows the single testing device 200, the scope of the present disclosure is not limited thereto. For example, the testing device may be configured as several devices to perform its functions.

Figure 7:
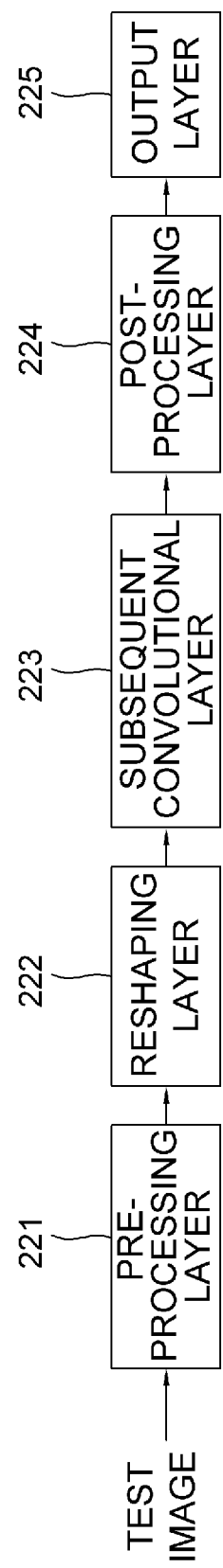
FIG. 7 is a drawing schematically illustrating a testing method for the CNN using the 1×K or the K×1 convolution operation in accordance with one example embodiment of the present disclosure.

A method for testing parameters of the CNN using the 1×K or the K×1 convolution operation by using the testing device 200 in accordance with one example embodiment of the present disclosure is described by referring to FIG. 7 as follows. In the description below, the part easily deducible from the learning method described by referring to FIGS. 1 to 5B will be omitted.

First, on condition that at least part of parameters of a subsequent convolutional layer 223 has been learned according to the learning method described by referring to FIGS. 1 to 7, if the test image is inputted, the testing device 200 may instruct a pre-processing layer 221 to pre-process the test image, to thereby generate the processed feature map for testing.

Herein, the pre-processing layer 221 may include at least one of the convolutional layer, the batch normalization layer, the activation layer, and the pooling layer, and may apply the convolution operations to the test image, to thereby generate the processed feature map for testing. Herein, the processed feature map for testing is a feature map generated by at least one of (i) a method of applying the convolution operations to the test image, (ii) that of applying subsequent operations, e.g., the batch normalization operation, the activation operation, the pooling operation, to a result of said method of (i), and (iii) that of applying additional convolution operations to a result of said method of (ii). However, the scope of the pre-processing layer 221 is not limited thereto, that is, the pre-processing layer 221 may include each layer which forms the CNN for image processing.

Next, the testing device 200 may instruct a reshaping layer 222 to two-dimensionally concatenate each of features in each group comprised of each corresponding K channels among all channels of the test image or its processed feature map, to thereby generate the reshaped feature map for testing. Herein, said processed feature map for testing is a feature map generated by at least one of (i) a method of applying the convolution operations to the test image, (ii) that of applying subsequent operations, e.g., the batch the normalization operation, the activation operation, the pooling operation, to a result of said method of (i), and (iii) that of applying additional convolution operations to a result of said method of (ii). Herein, the testing device 200 may directly input the test image into the reshaping layer 222, without instructing the pre-processing layer 221 to pre-process the test image.

Herein, if the number of channels of the test image or its processed feature map is not a multiple of K, the testing device 200 may instruct the reshaping layer 222 to add at least one dummy channel to the channels corresponding to each of the pixels such that the number of the channels including the at least one dummy channel is a multiple of K, and to concatenate said each of features in said each group comprised of said each corresponding K channels among said all channels, including the at least one dummy channel, of the test image or its processed feature map.

That is, supposing that a width of the test image or its processed feature map is W and a height thereof is H, and that the number of channels thereof is L, the testing device 200 may instruct the reshaping layer 222 to (i) generate the reshaped feature map for testing having a width of W, a height of H·K, and a channel of $$CEIL\left(\frac{L}{K}\right),$$

or (ii) generate the reshaped feature map for testing having a width of W·K, a height of H, and a channel of $$CEIL\left(\frac{L}{K}\right).$$

Further, if a size of a final part of the reshaped feature map for testing on a $$\left\{CEIL\left(\frac{L}{K}\right)\right\}-th$$

channel is different from a size of the width of W and the height of H·K, the testing device 200 may instruct the reshaping layer 222 to add at least one zero padding such that the final part of the reshaped feature map for testing on the $$\{CEIL(\tfrac{L}{K})\}\text{-}th$$

channel has the width of W and the height of H·K, or if the size of the final part of the reshaped feature map for testing on the $$\{CEIL(\tfrac{L}{K})\}\text{-}th$$

channel is different from a size of a width of W·K and a height of H, the testing device 200 may instruct the reshaping layer 222 to add at least one zero padding such that the final part of the reshaped feature map for testing on the $$\{CEIL(\tfrac{L}{K})\}\text{-}th$$

channel has the width of W·K and the height of H.

Herein, the reshaped feature map for testing may have a width of W, a height of H·K, and a channel of $$CEIL(\tfrac{L}{K}).$$

Also, each channel of the reshaped feature map for testing may correspond to each group comprised of K channels of the test image or its processed feature map. That is, a first channel of the reshaped feature map for testing may correspond to a first channel to a K-th channel of the test image or its processed feature map, and a second channel of the reshaped feature map for testing may correspond to a (K+1)-th channel to a (2·K)-th channel of the test image or its processed feature map. Also, a $$CEIL(\tfrac{L}{K})\text{-}th$$

channel of the reshaped feature map for testing may correspond to a $$\{(CEIL(\tfrac{L}{K})-1)\cdot K+1\}\text{-}th$$

channel to an L-th channel of the test image or its processed feature map.

Then, the testing device 200 may instruct the subsequent convolutional layer 223 to apply the 1×K convolution operation to the reshaped feature map for testing, to thereby generate the adjusted feature map for testing whose volume is adjusted. Herein, the number of channels of the adjusted feature map for testing may correspond to the number of kernels of the subsequent convolutional layer 223 performing the 1×K convolution operation, that is, the number of the filters. As one example, if the number of the kernels of the subsequent convolutional layer 223 is M, the number of the channels of the adjusted feature map for testing may be M.

The method using the 1×K convolution operation is described above, however, features of K channels of the test image or its processed feature map may be concatenated in a direction of a width and then the K×1 convolution operation may be performed.

That is, as described by referring to FIG. 5A, the reshaped feature map for testing may have a width of W·K, a height of H, and a channel of $$CEIL(\tfrac{L}{K}).$$

Also, each channel of the reshaped feature map for testing may correspond to each group comprised of K channels of the test image or its processed feature map.

Then, the testing device 200 may instruct the subsequent convolutional layer 223 to apply the K×1 convolution operation to the reshaped feature map for testing, to thereby generate the adjusted feature map for testing whose volume is adjusted.

Next, the testing device 200 may instruct a post-processing layer 224 to post-process the adjusted feature map for testing outputted from the subsequent convolutional layer 223. Herein, the post-processing layer 224 may include at least one of the convolutional layer, the batch normalization layer, the activation layer, the pooling layer, and the FC layer, and may generate probability information representing classified features of the adjusted feature map for testing or its processed feature map outputted from the subsequent convolutional layer 223. However, the scope of the post-processing layer 224 is not limited thereto, that is, the post-processing layer 224 may include each layer which forms the CNN for image processing.

Then, the testing device 200 may instruct the output layer 225 to generate at least one output for testing by referring to features on the adjusted feature map for testing or its processed feature map.

The present disclosure has an effect of reducing the amount of the convolution operations of the CNN efficiently by using the 1×K or the K×1 convolution operation.

The present disclosure has another effect of extracting features on an image by the convolution operations since the number of channels of an inputted feature map or the image is increased by a factor of K using the 1×K or the K×1 convolution operation.

The method in accordance with the present disclosure may be provided to be used for hardware optimization which satisfies KPI (key performance index).

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for learning parameters of a CNN using a 1×K convolution operation or a K×1 convolution operation, comprising steps of:
    (a) instructing, by a learning device when at least one training image is acquired, wherein a processed feature map of the training image has a width (W), a height (H), and a depth (L) comprised of a plurality of channels, wherein each channel of the plurality of channels has a plurality of features, and wherein each feature of the plurality of features corresponds to each pixel of the processed feature map of the training image, a reshaping layer to two-dimensionally concatenate each of features of K different channels corresponding to said each pixel in each group comprised of each corresponding K different channels among the plurality of channels, to thereby generate a reshaped feature map, wherein each pixel of each channel in the reshaped feature map corresponds on a one-on-one basis to each of the two-dimensionally concatenated features in said each group comprised of said each corresponding K different channels, and instructing a subsequent convolutional layer to apply the 1×K convolution operation or the K×1 convolution operation to the reshaped feature map, to thereby generate an adjusted feature map whose volume is adjusted; and
    (b) instructing, by the learning device, an output layer to generate at least one output by referring to features on at least one of the adjusted feature map and a processed feature map of the adjusted feature map, and instructing, by the learning device, a loss layer to calculate one or more losses by referring to the output and a corresponding at least one ground truth of the output, to thereby learn at least part of parameters of the subsequent convolutional layer by backpropagating the losses;
    further comprising, at the step of (a), instructing, by the learning device, when the depth (L) of the processed feature map of the training image is not a multiple of K, the reshaping layer to:
        add at least one dummy channel to the plurality of channels of the processed feature map of the training image such that the depth (L) including the plurality of channels and the at least one dummy channel is a multiple of K, and
        concatenate said each of features in said each group comprised of said each corresponding K channels among said all plurality of channels, including the at least one dummy channel, of the processed feature map of the training image,
    wherein the processed feature map is reshaped to form the reshaped feature map by rearranging values of pixels of the processed feature map on a one-by-one basis, located in K channels, on a single channel, and the values of the pixels are maintained before and after being reshaped.

2. The method of claim 1, further comprising, at the step of (a), instructing, by the learning device, the reshaping layer to generate the reshaped feature map having a width of W, a height of H·K, and a depth of $$\mathrm{CEIL}\left(\frac{L}{K}\right)$$

channels.

3. The method of claim 2, wherein the number of kernels of the subsequent convolutional layer is M, and further comprising, at the step of (a), instructing, by the learning device, the subsequent convolutional layer to apply a 1×K convolution operation to the reshaped feature map, to thereby generate the adjusted feature map having a volume of W·H·M, resulting from a width of W, a height of H, and a depth of M channels.

4. The method of claim 1, further comprising, at the step of (a), instructing, by the learning device, the reshaping layer to generate the reshaped feature map having a width of W·K, a height of H, and a depth of $$\mathrm{CEIL}\left(\frac{L}{K}\right)$$

channels.

5. The method of claim 4, wherein the number of kernels of the subsequent convolutional layer is M, and further comprising, at the step of (a), instructing, by the learning device, the subsequent convolutional layer to apply a K×1 convolution operation to the reshaped feature map, to thereby generate the adjusted feature map having a volume of W·H·M, resulting from a width of W, a height of H, and a depth of M channels.

6. The method of claim 1, further comprising, at the step of (a),
    instructing, by the learning device, the reshaping layer to at least one of: (i) generate the reshaped feature map having a width of W, a height of H·K, and a depth of CEIL( ) channels, and (ii) generate the reshaped feature map having a width of W·K, a height of H, and a depth $$\mathrm{CEIL}\left(\frac{L}{K}\right)$$

channels, and
    at least one of:
        instructing, by the learning device when a size of a final part of the reshaped feature map on a {CEIL( )}-th channel is different from a size of a width of W and a height of H·K, the reshaping layer to add at least one row and column of zero padding such that the final part of the reshaped feature map on the $$\left\{\text{CEIL}\left(\frac{L}{K}\right)\right\} - th$$

channel has the width of W and the height of H·K, and instructing, by the learning device when the size of the final part of the reshaped feature map on the {CEIL( )}-th channel is different from a size of a width of W·K and a height of H, the reshaping layer to add at least one row and column of zero padding such that the final part of the reshaped feature map on the $$\left\{\text{CEIL}\left(\frac{L}{K}\right)\right\} - th$$

channel has the width of W·K and the height of H.

7. A method for testing a CNN using a 1×K convolution operation or a K×1 convolution operation, comprising steps of:
(a) on condition that a learning device (i) has, upon acquiring at least one training image, wherein a processed feature map of the training image has a width (W), a height (H), and a depth (L) comprised of a plurality of channels, wherein each channel of the plurality of channels has a plurality of features for training, and wherein each feature of the plurality of features for training corresponds to each pixel of the processed feature map of the training image, instructed a reshaping layer to two-dimensionally concatenate each of features for training of K different channels corresponding to said each pixel in each group comprised of each corresponding K different channels among the plurality of channels of the processed feature map of the training image, to thereby generate a reshaped feature map for training, wherein each pixel of each channel in the reshaped feature map for training corresponds on a one-on-one basis to each of the two-dimensionally concatenated features in said each group comprised of said each corresponding K different channels, and has instructed a subsequent convolutional layer to apply the 1×K convolution operation or the K×1 convolution operation to the reshaped feature map for training, to thereby generate an adjusted feature map for training whose volume is adjusted, and (ii) has instructed an output layer to generate at least one output for training by referring to features on at least one of the adjusted feature map for training and a processed feature map of the adjusted feature map for training, and has instructed a loss layer to calculate one or more losses by referring to the output for training and a corresponding at least one ground truth of the output for training, to thereby learn at least part of parameters of the subsequent convolutional layer by backpropagating the losses; instructing, by a testing device when at least one test image is acquired, wherein at least one of the test image and a processed feature map of the test image has the width (W), the height (H), and the depth (L) comprised of the plurality of channels, wherein each channel of the plurality of channels has a plurality of features for testing, and wherein each feature of the plurality of features for testing corresponds to each pixel of at least one of the test image and the processed feature map of the test image, the reshaping layer to two-dimensionally concatenate each of features for testing of K different channels corresponding to said each pixel in each group comprised of each corresponding K different channels among the plurality of channels of at least one of the test image and the processed feature map of the test image, to thereby generate a reshaped feature map for testing, wherein each pixel of each channel in the reshaped feature map for testing corresponds to each of the two-dimensionally concatenated features in said each group comprised of said each corresponding K different channels, and instructing the subsequent convolutional layer to apply the 1×K convolution operation or the K×1 convolution operation to the reshaped feature map for testing, to thereby generate an adjusted feature map for testing whose volume is adjusted; and
(b) the testing device instructing the output layer to generate at least one output for testing by referring to features on the adjusted feature map for testing or its processed feature map;
further comprising, at the step of (a), instructing, by the testing device, when the depth (L) of the processed feature map of the test image is not a multiple of K, the reshaping layer to:
add at least one dummy channel to the plurality of channels of the processed feature map of the test image such that the depth (L) including the plurality of channels and the at least one dummy channel is a multiple of K, and
concatenate said each of features in said each group comprised of said each corresponding K channels among said all plurality of channels, including the at least one dummy channel, of the processed feature map of the test image
wherein the processed feature map is reshaped to form the reshaped feature map by rearranging values of pixels of the processed feature map on a one-by-one basis, located in K channels, on a single channel, and the values of the pixels are maintained before and after being reshaped.

8. The method of claim 7, further comprising, at the step of (a), instructing, by the testing device, the reshaping layer to generate the reshaped feature map for testing having a width of W, a height of H·K, and a depth of $$\text{CEIL}\left(\frac{L}{K}\right)$$

channels.

9. The method of claim 8, wherein the number of kernels of the subsequent convolutional layer is M, and further comprising, at the step of (a), instructing, by the testing device, the subsequent convolutional layer to apply a 1×K convolution operation to the reshaped feature map for testing, to thereby generate the adjusted feature map for testing having a volume of W·H·M, resulting from a width of W, a height of H, and a depth of M channels.

10. The method of claim 7, further comprising, at the step of (a), instructing, by the testing device, the reshaping layer to generate the reshaped feature map for testing having a width of W·K, a height of H, and a depth of $$\text{CEIL}\left(\frac{L}{K}\right)$$

channels.

11. The method of claim 10, wherein the number of kernels of the subsequent convolutional layer is M, and further comprising, at the step of (a), instructing, by the testing device, the subsequent convolutional layer to apply a K×1 convolution operation to the reshaped feature map for testing, to thereby generate the adjusted feature map for testing having a volume of W·H·M, resulting from a width of W, a height of H, and a depth of M channels.

12. The method of claim 7, further comprising, at the step of (a),
instructing, by the testing device, the reshaping layer to at least one of: (i) generate the reshaped feature map for testing having a width of W, a height of H·K, and a depth of CEIL( ) channels, and (ii) generate the reshaped feature map for testing having a width of W·K, a height of H, and a depth of $$\text{CEIL}\left(\frac{L}{K}\right)$$

channels, and
at least one of:
instructing, by the testing device when a size of a final part of the reshaped feature map for testing on a {CEIL( )}-th channel is different from a size of a width of W and a height of H·K, the reshaping layer to add at least one row and column of zero padding such that the final part of the reshaped feature map for testing on the $$\left\{\text{CEIL}\left(\frac{L}{K}\right)\right\}\text{-}th$$

channel has the width of W and the height of H·K, and
instructing, by the testing device when the size of the final part of the reshaped feature map for testing on the {CEIL( )}-th channel is different from a size of a width of W·K and a height of H, the reshaping layer to add at least one row and column of zero padding such that the final part of the reshaped feature map for testing on the $$\left\{\text{CEIL}\left(\frac{L}{K}\right)\right\}\text{-}th$$

channel has the width of W·K and the height of H.

13. A learning device for learning parameters of a CNN using a 1×K convolution operation or a K×1 convolution operation, comprising:
at least one memory that stores instructions; and
at least one processor configured to execute the instructions to: perform processes of (I) instructing, when at least one training image is acquired by the learning device, wherein a processed feature map of the training image has a width (W), a height (H), and a depth (L) comprised of a plurality of channels, wherein each channel of the plurality of channels has a plurality of features, and wherein each feature of the plurality of features corresponds to each pixel of the processed feature map of the training image, a reshaping layer to two-dimensionally concatenate each of features of K different channels corresponding to said each pixel in each group comprised of each corresponding K different channels among the plurality of channels, to thereby generate a reshaped feature map, wherein each pixel of each channel in the reshaped feature map corresponds on a one-on-one basis to each of the two-dimensionally concatenated features in said each group comprised of said each corresponding K different channels, and instructing a subsequent convolutional layer to apply the 1×K convolution operation or the K×1 convolution operation to the reshaped feature map, to thereby generate an adjusted feature map whose volume is adjusted, and (II) instructing an output layer to generate at least one output by referring to features on at least one of the adjusted feature map and a processed feature map of the adjusted feature map, and instructing a loss layer to calculate one or more losses by referring to the output and a corresponding at least one ground truth of the output, to thereby learn at least part of parameters of the subsequent convolutional layer by backpropagating the losses;
wherein, at the process of (I), the processor, when the depth (L) of the pre-processed feature map of the training image is not a multiple of K, instructs the reshaping layer to:
add at least one dummy channel to the plurality of channels the processed feature map of the training image such that the depth (L) including the plurality of channels and the at least one dummy channel is a multiple of K, and
concatenate said each of features in said each group comprised of said each corresponding K channels among said all plurality of channels, including the at least one dummy channel, of the pre-processed feature map of the training image;
wherein the processed feature map is reshaped to form the reshaped feature map by rearranging values of pixels of the processed feature map on a one-by-one basis, located in K channels, on a single channel, and the values of the pixels are maintained before and after being reshaped.

14. The learning device of claim 13, wherein at the process of (I), the processor instructs the reshaping layer to generate the reshaped feature map having a width of W, a height of H·K, and a depth of $$\text{CEIL}\left(\frac{L}{K}\right)$$

channels.

15. The learning device of claim 14, wherein the number of kernels of the subsequent convolutional layer is M, at the process of (I), the processor instructs the subsequent convolutional layer to apply a 1×K convolution operation to the reshaped feature map, to thereby generate the adjusted feature map having a volume of W·H·M, resulting from a width of W, a height of H, and a depth of M channels.

16. The learning device of claim 13, wherein at the process of (I), the processor instructs the reshaping layer to generate the reshaped feature map having a width of W·K, a height of H, and a depth of $$\text{CEIL}\left(\frac{L}{K}\right)$$

channels.

17. The learning device of claim 16, wherein the number of kernels of the subsequent convolutional layer is M, at the process of (I), the processor instructs the subsequent convolutional layer to apply a K×1 convolution operation to the reshaped feature map, to thereby generate the adjusted feature map having a volume of W·H·M, resulting from a width of W, a height of H, and a depth of M channels.

18. The learning device of claim 13, wherein at the process of (I),
the processor instructs the reshaping layer to at least one of: (i) generate the reshaped feature map having a width of W, a height of H·K, and a depth of CEIL( ) channels, and (ii) generate the reshaped feature map having a width of W·K, a height of H, and a depth of $$\text{CEIL}\left(\frac{L}{K}\right)$$

channels, and
at least one of:
wherein, when a size of a final part of the reshaped feature map on a {CEIL( )}-th channel is different from a size of a width of W and a height of H·K, the processor instructs the reshaping layer to add at least one row and column of zero padding such that the final part of the reshaped feature map on the $$\left\{\text{CEIL}\left(\frac{L}{K}\right)\right\}\text{-}th$$

channel has the width of W and the height of H·K, and
wherein, when the size of the final part of the reshaped feature map on the {CEIL( )}-th channel is different from a size of a width of W·K and a height of H, the processor instructs the reshaping layer to add at least one row and column of zero padding such that the final part of the reshaped feature map on the $$\left\{\text{CEIL}\left(\frac{L}{K}\right)\right\}\text{-}th$$

channel has the width of W·K and the height of H.

19. A testing device for testing a CNN using a 1×K convolution operation or a K×1 convolution operation, comprising:
at least one memory that stores instructions; and
at least one processor, on condition that a learning device (i) has, upon acquiring at least one training image, wherein a processed feature map of the training image has a width (W), a height (H), and a depth (L) comprised of a plurality of channels, wherein each channel of the plurality of channels has a plurality of features for training, and wherein each feature of the plurality of features for training corresponds to each pixel of the processed feature map of the training image, instructed a reshaping layer to two-dimensionally concatenate each of features for training of K different channels corresponding to said each pixel in each group comprised of each corresponding K different channels among the plurality of channels of the processed feature map of the training image, to thereby generate a reshaped feature map for training, wherein each pixel of each channel in the reshaped feature map for training corresponds to each of the two-dimensionally concatenated features in said each group comprised of said each corresponding K different channels, and has instructed a subsequent convolutional layer to apply the 1×K convolution operation or the K×1 convolution operation to the reshaped feature map for training, to thereby generate an adjusted feature map for training whose volume is adjusted, and (ii) has instructed an output layer to generate at least one output for training by referring to features on at least one of the adjusted feature map for training and a processed feature map of the adjusted feature map for training, and has instructed a loss layer to calculate one or more losses by referring to the output for training and a corresponding at least one ground truth of the output for training, to thereby learn at least part of parameters of the subsequent convolutional layer by backpropagating the losses; configured to execute the instructions to: perform processes of (I) instructing, when at least one test image is acquired, wherein at least one of the test image and a processed feature map of the test image has the width (W), the height (H), and the depth (L) comprised of the plurality of channels, wherein each channel of the plurality of channels has a plurality of features for testing, and wherein each feature of the plurality of features for testing corresponds to each pixel of at least one of the test image and the processed feature map of the test image, the reshaping layer to two-dimensionally concatenate each of features for testing of K different channels corresponding to said each pixel in each group comprised of each corresponding K different channels among the plurality of channels of at least one of the test image and the processed feature map of the test image, to thereby generate a reshaped feature map for testing, wherein each pixel of each channel in the reshaped feature map for testing corresponds on a one-on-one basis to each of the two-dimensionally concatenated features in said each group comprised of said each corresponding K different channels, and instructing the subsequent convolutional layer to apply the 1×K convolution operation or the K×1 convolution operation to the reshaped feature map for testing, to thereby generate an adjusted feature map for testing whose volume is adjusted, and (II) instructing the output layer to generate at least one output for testing by referring to features on the adjusted feature map for testing or its processed feature map;
wherein, at the process of (I), the processor, when the depth (L) of the processed feature map of the test image is not a multiple of K, instructs the reshaping layer to:
add at least one dummy channel to the plurality of channels of the processed feature map of the test image such that the depth (L) including the plurality of channels and the at least one dummy channel is a multiple of K, and
concatenate said each of features in said each group comprised of said each corresponding K channels among said all plurality of channels, including the at least one dummy channel, of the processed feature map of the test image
wherein the processed feature map is to form the reshaped feature map by rearranging values of pixels of the processed feature map on a one-by-one basis, located in K channels, on a single channel, and the values of the pixels are maintained before and after being reshaped.

20. The testing device of claim 19, wherein at the process of (I), the processor instructs the reshaping layer to generate the reshaped feature map for testing having a width of W, a height off H·K, and a depth of $$\text{CEIL}\left(\frac{L}{K}\right)$$

channels.

21. The testing device of claim 20, wherein the number of kernels of the subsequent convolutional layer is M, at the process of (I), the processor instructs the subsequent convolutional layer to apply a 1×K convolution operation to the reshaped feature map for testing, to thereby generate the adjusted feature map for testing having a volume of W·H·M, resulting from a width of W, a height of H, and a depth of M channels.

22. The testing device of claim 19, wherein at the process of (I), the processor instructs the reshaping layer to generate the reshaped feature map for testing having a width of W·K, a height of H, and a depth of $$\text{CEIL}\left(\frac{L}{K}\right)$$

channels.

23. The testing device of claim 22, wherein the number of kernels of the subsequent convolutional layer is M, at the process of (I), the processor instructs the subsequent convolutional layer to apply a K×1 convolution operation to the reshaped feature map for testing, to thereby generate the adjusted feature map for testing having a volume of W·H·M, resulting from a width of W, a height of H, and a depth of M channels.

24. The testing device of claim 19, wherein at the process of (I),
the processor instructs the reshaping layer to at least one of: (i) generate the reshaped feature map for testing having a width of W, a height of H·K, and a depth of CEIL( ) channels, and (ii) generate the reshaped feature map for testing having a width of W·K, a height of H, and a depth of $$\text{CEIL}\left(\frac{L}{K}\right)$$

channels, and
at least one of:
wherein, when a size of a final part of the reshaped feature map for testing on a {CEIL( )}-th channel is different from a size of a width of W and a height of H·K, the processor instructs the reshaping layer to add at least one row and column of zero padding such that the final part of the reshaped feature map for testing on the $$\left\{\text{CEIL}\left(\frac{L}{K}\right)\right\}-th$$

channel has the width of W and the height of H·K, and
wherein, when the size of the final part of the reshaped feature map for testing on the {CEIL( )}-th channel is different from a size of a width of W·K and a height of H, the processor instructs the reshaping layer to add at least one row and column of zero padding such that the final part of the reshaped feature map for testing on the $$\left\{\text{CEIL}\left(\frac{L}{K}\right)\right\}-th$$

channel has the width of W·K and the height of H.

* * * * *